(12) United States Patent
Wong et al.

(10) Patent No.: US 11,016,247 B2
(45) Date of Patent: May 25, 2021

(54) MECHANICAL SPLICE PROTECTIVE SLEEVE FOR SECURING A SPLICE AREA FORMED BY SPLICING A PLURAL OF OPTICAL FIBERS

(71) Applicant: Senko Advanced Components Inc, Marlborough, MA (US)

(72) Inventors: Yim Wong, Kowloon (HK); Jin Jian Feng, Shanghai (CN)

(73) Assignee: Senko Advanced Components Inc, Marlborough, MA (US)

( * ) Notice: Subject to any disclaimer, the term of this patent is extended or adjusted under 35 U.S.C. 154(b) by 0 days.

(21) Appl. No.: 16/598,208

(22) Filed: Oct. 10, 2019

(65) Prior Publication Data
US 2020/0116945 A1 Apr. 16, 2020

Related U.S. Application Data

(60) Provisional application No. 62/744,245, filed on Oct. 11, 2018.

(51) Int. Cl.
*G02B 6/38* (2006.01)
(52) U.S. Cl.
CPC ................... *G02B 6/3801* (2013.01)
(58) Field of Classification Search
CPC .................................................. G02B 6/3801
USPC ........................................................... 385/95
See application file for complete search history.

(56) References Cited

U.S. PATENT DOCUMENTS

| | | | |
|---|---|---|---|
| 6,439,780 B1 | 8/2002 | Mudd et al. | |
| 6,447,172 B1 * | 9/2002 | Stephenson | G02B 6/381 385/58 |
| 6,554,485 B1 * | 4/2003 | Beatty | G02B 6/3849 385/70 |
| 6,769,823 B2 | 8/2004 | Morita et al. | |
| 6,817,786 B2 | 11/2004 | Sato et al. | |
| 6,890,109 B2 | 5/2005 | Arima et al. | |
| 7,712,971 B2 * | 5/2010 | Lee | G02B 6/3858 385/62 |
| 7,918,612 B1 | 4/2011 | Zhao et al. | |
| 7,934,874 B2 | 5/2011 | Honma et al. | |
| 8,103,144 B1 | 1/2012 | Zhao et al. | |
| 8,333,519 B2 | 12/2012 | Marcouiller et al. | |
| 8,408,811 B2 | 4/2013 | de Jong et al. | |
| 8,596,883 B2 * | 12/2013 | Taira | G02B 6/3849 385/78 |
| 8,740,479 B2 | 6/2014 | Shitama et al. | |
| 8,950,955 B2 | 2/2015 | Fukuda et al. | |

(Continued)

OTHER PUBLICATIONS

International Search Report and Written Opinion, Application No. PCT/US2019/055990, dated Dec. 18, 2019.

(Continued)

*Primary Examiner* — Jerry M Blevins
(74) *Attorney, Agent, or Firm* — Edward S. Jarmolowicz, Esq.

(57) ABSTRACT

A fiber optic connector is spliced to an optical fiber provided by a sheathed optical fiber and an optical fiber pigtail. The connector houses a protective sleeve that secures the splice area from damage due to movement of optical fibers during connecter use. The protective sleeve retains the sheathed optical fiber at a first end and secures the protective sleeve to a distal end of a ferrule flange assembly at a second end.

2 Claims, 8 Drawing Sheets

(56) References Cited

U.S. PATENT DOCUMENTS

| | | |
|---|---|---|
| 9,016,953 B2 | 4/2015 | Ott et al. |
| 9,052,469 B2 | 6/2015 | Bauco et al. |
| 9,151,905 B2 | 10/2015 | Bauco et al. |
| 9,304,262 B2 | 4/2016 | Lu |
| 9,395,500 B2 | 7/2016 | Zimmel |
| 9,442,257 B2 | 9/2016 | Lu |
| 9,470,850 B2 | 10/2016 | Ott et al. |
| 9,513,439 B2 | 12/2016 | Sasaki |
| 9,720,185 B2 | 8/2017 | Halls et al. |
| 9,864,151 B2 | 1/2018 | Lu |
| 9,946,015 B2 | 4/2018 | Iwase et al. |
| 9,964,715 B2 | 5/2018 | Lu |
| 10,180,541 B2 | 1/2019 | Coenegracht et al. |
| 10,274,671 B2 | 4/2019 | Iwase et al. |
| 10,353,154 B2 | 7/2019 | Ott et al. |
| 10,451,811 B2 | 10/2019 | Coenegracht et al. |
| 10,451,817 B2 | 10/2019 | Lu |
| 10,598,856 B1 | 3/2020 | Baranek et al. |
| 10,641,960 B1 | 5/2020 | Baranek et al. |
| 2018/0031774 A1* | 2/2018 | Van Baelen ............ G02B 6/387 |
| 2018/0045894 A1* | 2/2018 | Takahashi ............ G02B 6/3801 |
| 2019/0137711 A1 | 5/2019 | Burek et al. |
| 2019/0196105 A1 | 6/2019 | Meo et al. |
| 2019/0302367 A1 | 10/2019 | Van Baelen |
| 2020/0081186 A1 | 3/2020 | Wu |
| 2020/0116936 A1 | 4/2020 | Wong et al. |

OTHER PUBLICATIONS

International Search Report and Written Opinion dated Dec. 18, 2019 from related International Application No. PCT/US2019/055990, International Filing Date Oct. 11, 2019.

\* cited by examiner

MECHANICAL SPLICE PROTECTIVE SLEEVE FOR SECURING A SPLICE AREA FORMED BY SPLICING A PLURAL OF OPTICAL FIBERS

CROSS-REFERENCES TO RELATED APPLICATIONS

This application claims priority to U.S. Patent Application 62/744,245 filed on Oct. 11, 2018, titled "Protective Assembly for Splicing Optic Strands", which is fully incorporated by reference into this application.

FIELD OF THE INVENTION

The present invention relates to fiber optic connectors, and more particularly, to a protective housing to hold one or more spliced optical fibers.

BACKGROUND OF THE INVENTION

Modern high capacity optical systems often utilize fiber optic connectors for inter-system connection. As there are multiple connection points in an optical path, and a spring is typically required to bias forward a ferrule assembly, there is a need to simplify assembly of the fiber optic strands when splicing or connecting a fiber optic connector pigtail or short fiber to an optical fiber from a fiber optic cable or to another fiber optic connector.

SUMMARY OF THE INVENTION

According to the present invention, a fiber optic connector comprises a ferrule flange assembly formed by a ferrule, a ferrule locking flange, an inner flange and a flange retention stub. The ferrule flange assembly is locked within a fiber optic connector housing. The ferrule has an optical fiber along a longitudinal axis of the fiber optic connection with an optical fiber pigtail extending beyond a distal end of the flange retention stub. The inner flange and the flange retention stub form a circumferential guide opening that receives a retention flange at a second end of the protective sleeve. The second end of the protective sleeve is secured about the flange retention stub. A second optical fiber from a sheathed optical fiber is spliced to the optical fiber pigtail, and the spliced section or area is secured within a portion of the longitudinal channel formed within the protective sleeve.

BRIEF DESCRIPTION OF THE DRAWINGS

Embodiments of the invention are described in more detail hereinafter with reference to the drawings, in which.

DETAILED DESCRIPTION

The following description describes protecting splice points for splicing two fiber optic connectors together, or a fiber optic cable and a fiber optic connector together to form a network of optical devices. Splicing is performed in the factory called factory terminated connector or in the field, called field terminated connector. In the field can be in an office building. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
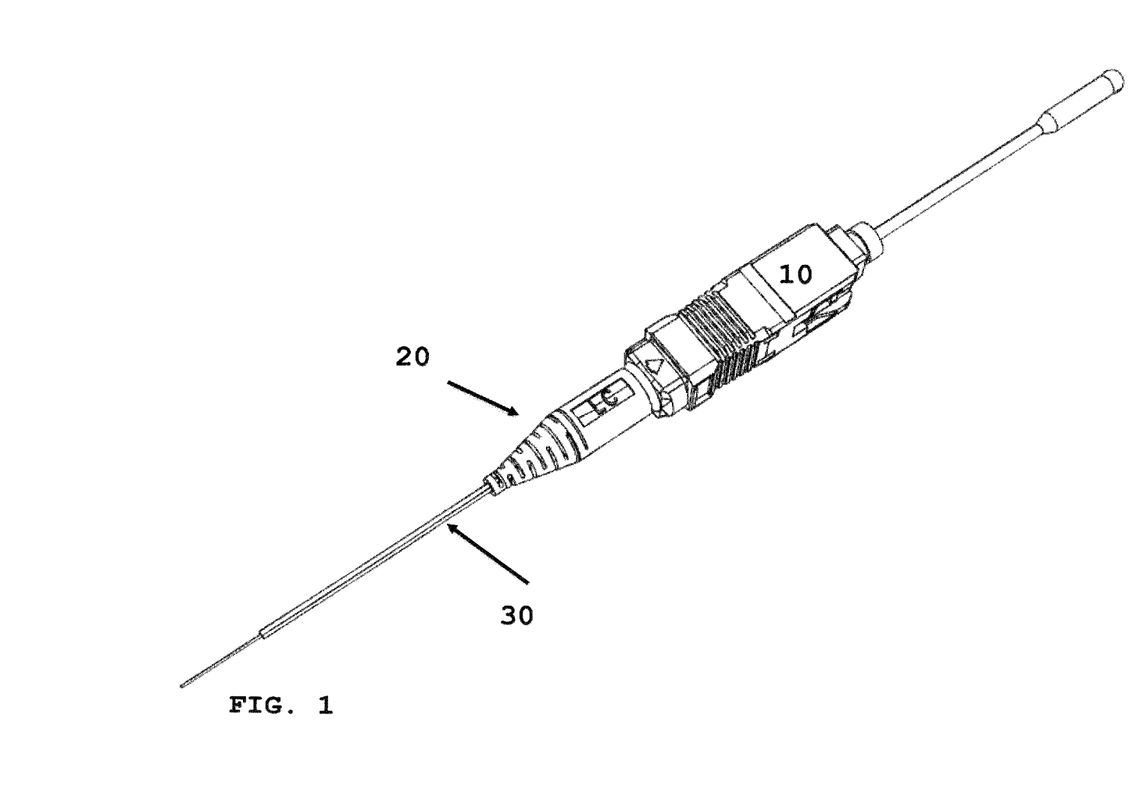
FIG. 1 is a perspective view of the assembled connector assembly deploying the splice-on protective tube of the present invention.

FIG. 1 depicts first fiber optic connector 10 spliced to second fiber optic connector 20. Second fiber optic connector 20 deploys spice-on protective sleeve 40 (at FIG. 7A and FIG. 7B). First fiber optic connector 10 can use the splice-on protective sleeve without departing from the scope of the invention. Sheathed optical fiber 30 provides a second optical fiber that is spliced to an optical fiber pigtail 33 provided at a distal end of ferrule 12 (FIG. 4).

Figure 2:
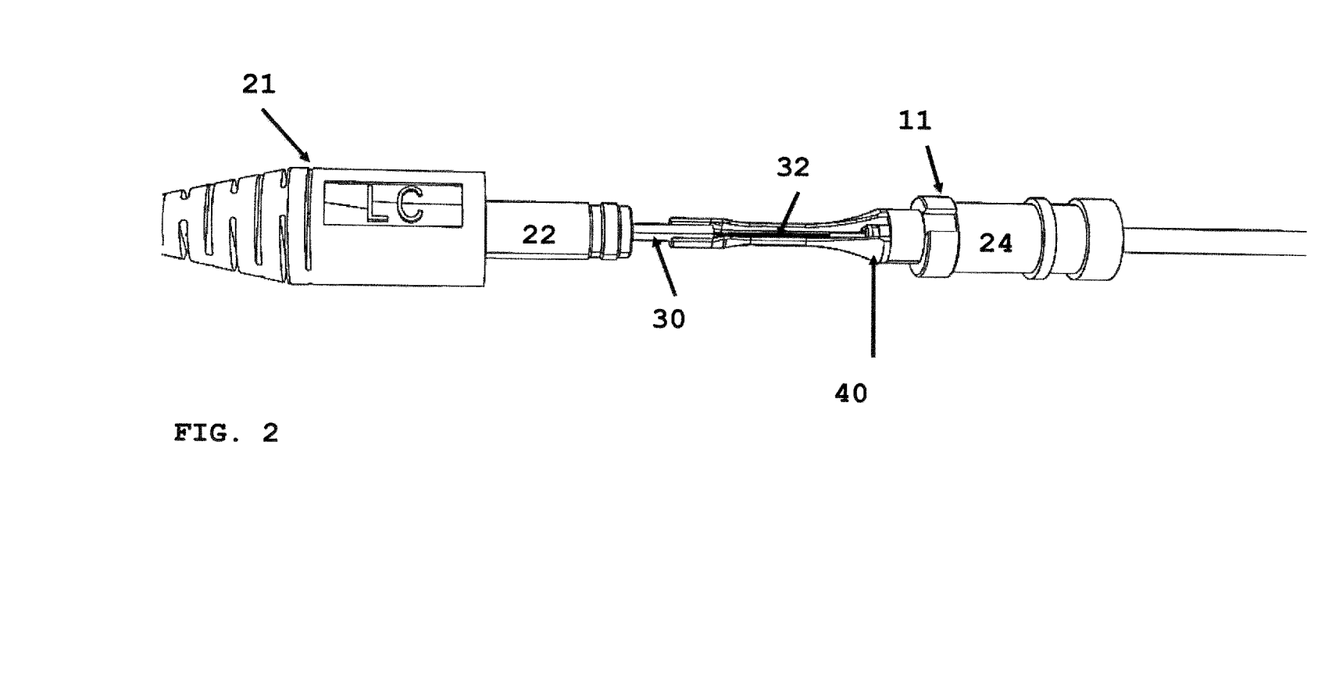
FIG. 2 is an isometric of select internal components of FIG. 1.

FIG. 2 depicts the second connector boot 21 and crimp tube assembly 22 with sheathed optical fiber 30 extending from a proximal end of the second connector. The sheathed optical fiber is secured within retention collar 48 at first end "FE" of protective sleeve 40 (also at FIG. 7B). Inner housing 24 of the second connector accepts ferrule flange assembly 11 (at FIG. 4). The distal end of the ferrule flange assembly accepts a proximal end or second end "SE" of protective sleeve 40 (also at FIG. 7A).

Figure 3:
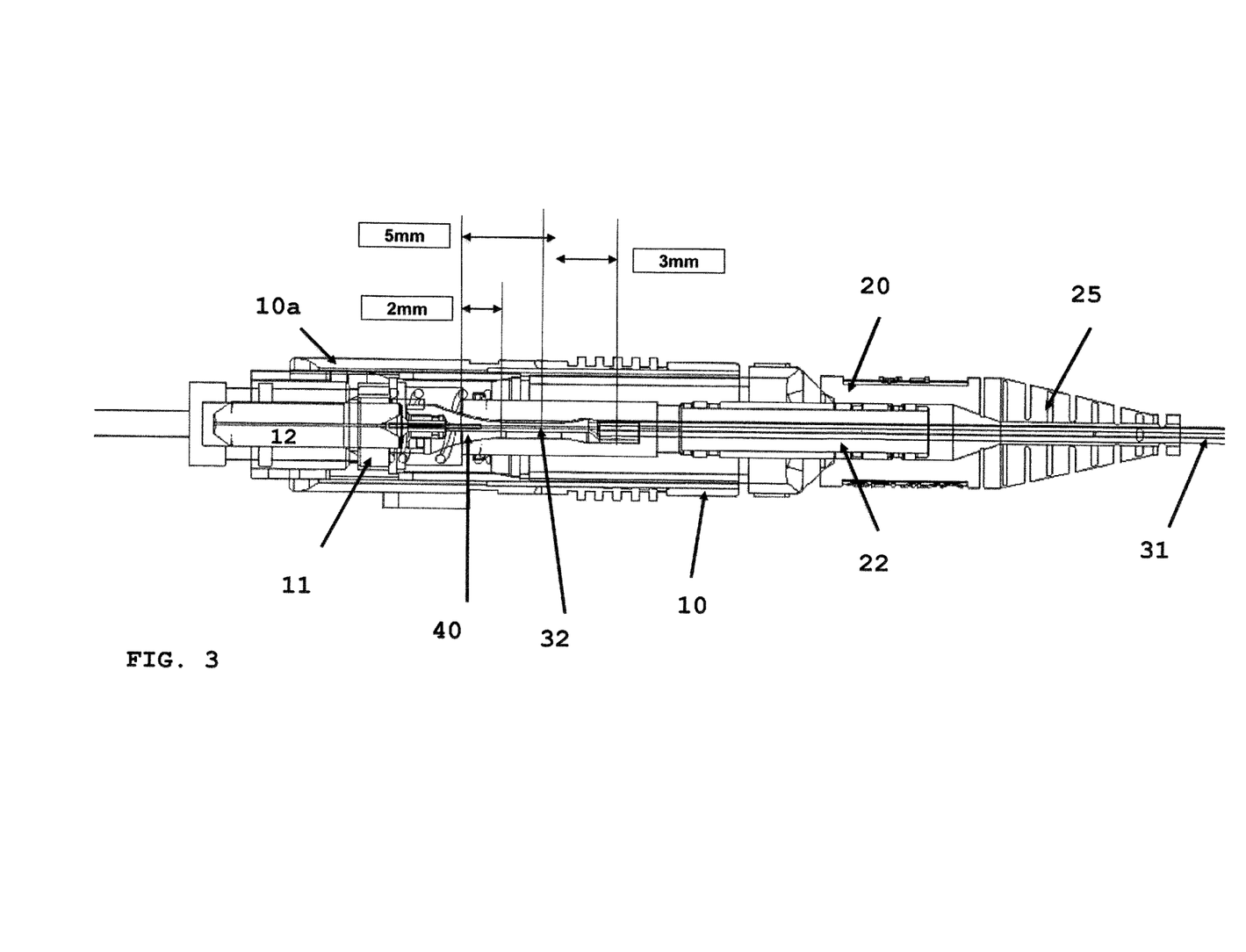
FIG. 3 is a cross-section view of the connector of FIG. 1.

FIG. 3 depicts a cross-section of FIG. 1. FIG. 3 describes an assembled first connector 10 and second connector 20 deploying protective sleeve 40. In this embodiment, protective sleeve 40 is deployed in the first connector as opposed to protective sleeve 40 deployed in the first connector (at FIG. 2). Referring to FIG. 3, ferrule flange assembly 11 secures protective sleeve 40 at a distal end of ferrule flange assembly 11. Ferrule 12 is secured at a proximal end of ferrule flange assembly 11. Ferrule flange assembly 11 is secured with the first connector housing 10a at a proximal end. Splice section or splice area 32 is secured within longitudinal channel 45 (at FIG. 7B). Optical fiber 31 formed as part the sheathed optical fiber enters boot 25 of second connector 20. Optical pigtail is about 2 mm long.

Figure 4:
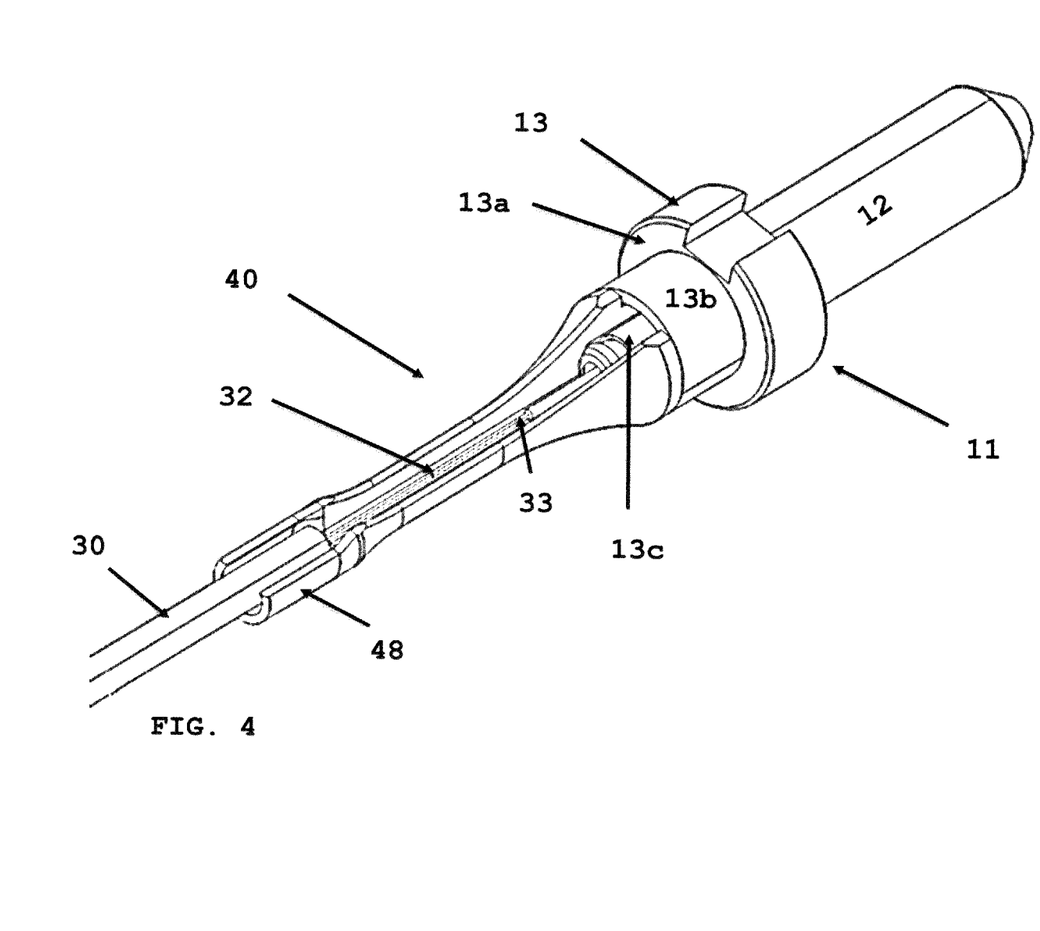
FIG. 4 is a perspective view of the splice-on protective tube.

FIG. 4 depicts protective sleeve 40 secured to ferrule flange assembly 11. Splice area 32 is secured within the channel of the protective sleeve. Splicing is done between the optical fiber of the sheathed optical fiber and optical fiber pigtail 33. Sheathed optical fiber 30 is secured within retention collar 48 to reduce movement due connector use at the splice points within splice area 32. Ferrule flange assembly 11 has ferrule locking flange 13 which secures the ferrule flange assembly and the protective tube at the proximal end of first connector 10 housing 10a, as shown in FIG. 3. Referring to FIG. 4, inner flange 13b is formed from outer flange 13a, and inner flange 13b is concentric with flange retention stub 13c forming circumferential guide opening 13e (at FIG. 6).

Figure 5:
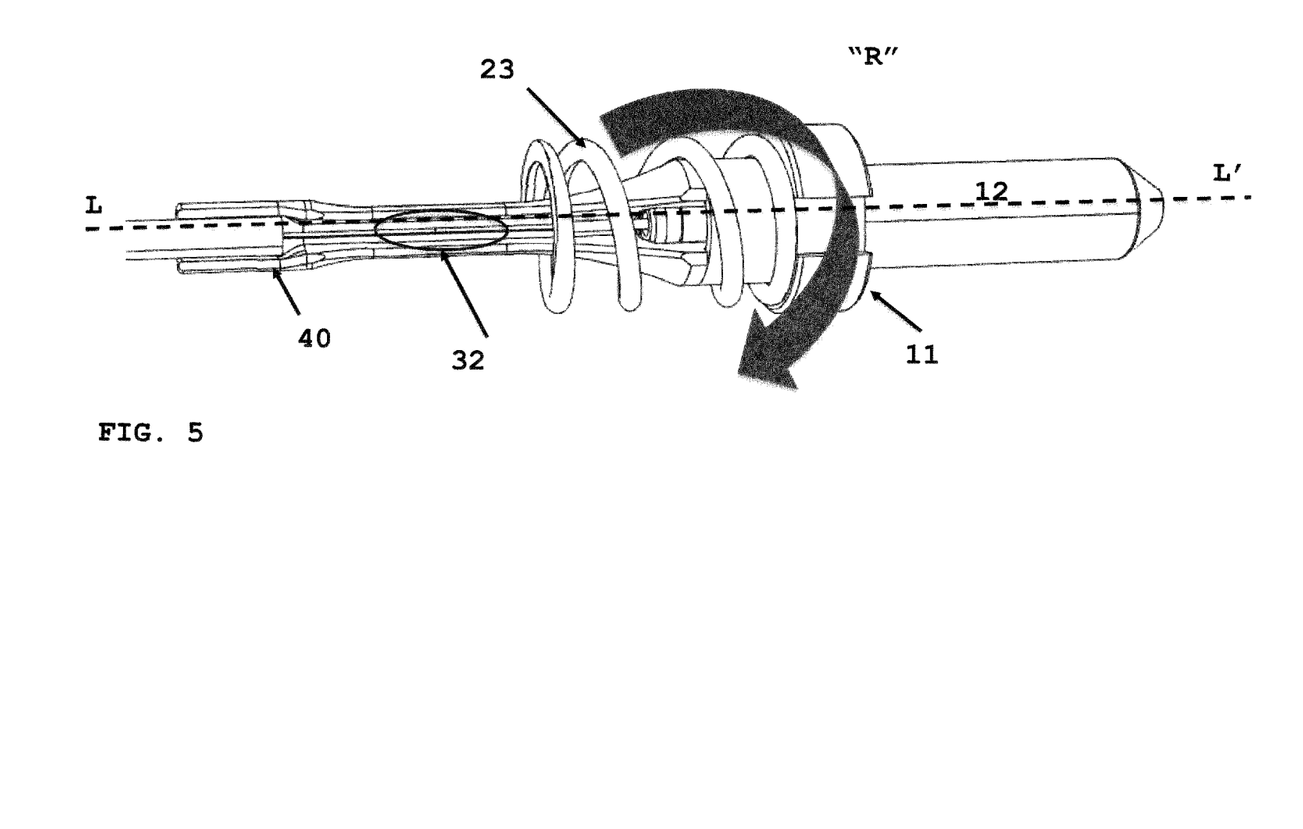
FIG. 5 is a side perspective view of FIG. 4.

FIG. 5 depicts a bias spring 23 about a distal end of ferrule flange assembly 11 and a proximal end of proximal sleeve 40. Bias spring 23 pushes forward ferrule flange assembly 11 when secured with a connector housing, to ensure ferrule 12 can make an optical communication path with another ferrule. Protective sleeve 40 can be rotated in direction of arrow "R" about longitudinal axis L-L'.

Figure 6:
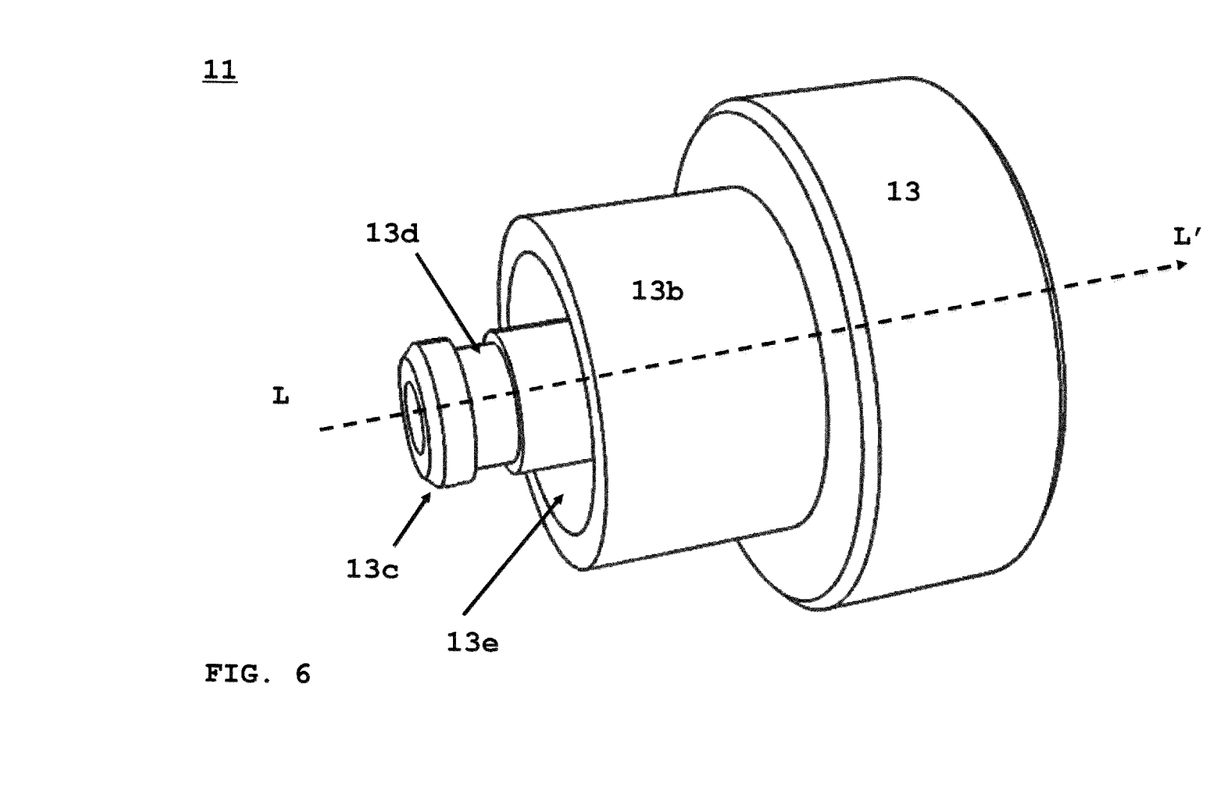
FIG. 6 is a perspective view of the ferrule flange assembly to secure the protective tube.

FIG. 6 depicts ferrule flange assembly 11. Along assembly 11 longitudinal axis L-L', at a distal end of assembly 11, flange retention stub 13*c* has recess 13*d* that accepts locking tab 44 (at FIG. 7B). The proximal end of protective sleeve 40 is inserted into circumferential guide opening 13*e* until inner stop face 43 (at FIG. 7B), engages the distal end of flange retention stub 13*c*.

Figures 7A, 7B:
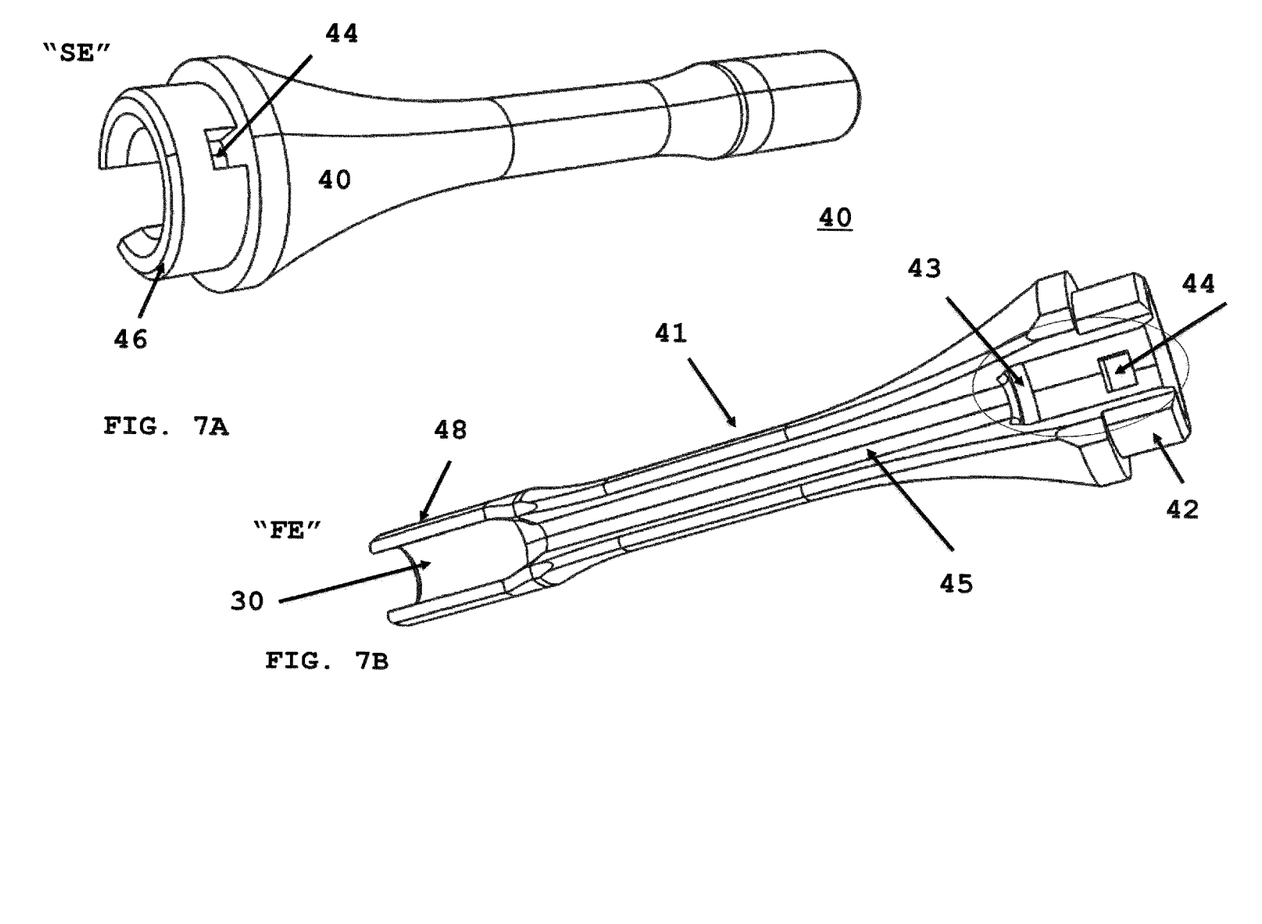
FIG. 7A is a back side perspective view of the splice-on protective tube.
FIG. 7B is a front side perspective view of the splice-on protective tube.

FIG. 7A depicts protective sleeve 40 showing chamfered guide surface 46 at a second end "SE" or proximal end of the protective sleeve. Guide surface 46 ensures upon mating protective sleeve 40 with guide opening 13*e*, insertion of sleeve 40 allows for the complete insertion of sleeve 40 within opening 13*e* until face 43 engages stub 13*c* and does not jam or twist. Once stop face 43 engages stub 13*e* at its proximal end, locking tab 44 is mated with recess 13*d* on stub 13*c*. When properly mated, protective sleeve 40 can be rotated about its longitudinal axis L-L' as depicted in FIG. 5. FIG. 7B depicts protective sleeve 40 at first end "FE" or a distal end of the sleeve. Retention collar 48 secures the sheathed optical fiber as described above. Main body portion 41 of protective sleeve 40 has channel 45 along its longitudinal axis L-L' (FIG. 5). Channel 45 retains the plural of optical fibers and splice area 32. Stop face 43 is described above. Retention flange 42 is accepted into guide opening 13*e* as described above and provides support for the proximal end of sleeve 40.

Figures 8A, 8B, 8C:
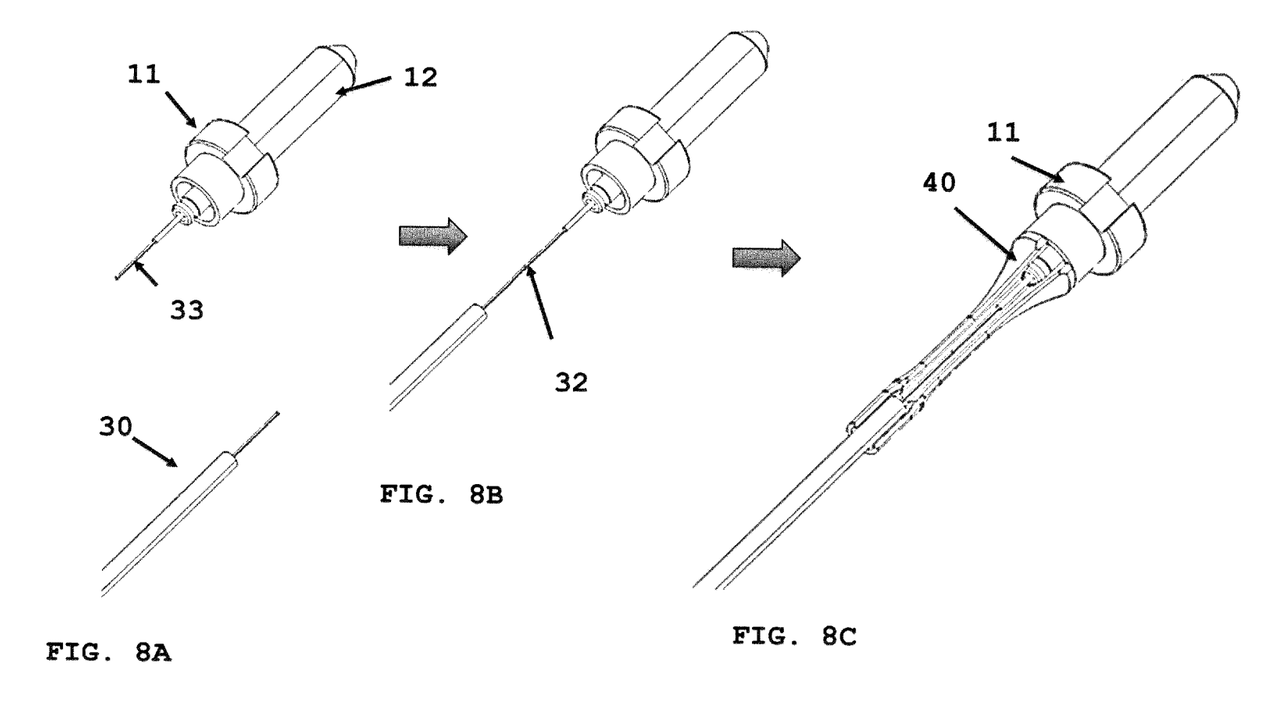
FIG. 8A-8C depicts the steps of using the splice-on protective tube.

FIGS. 8A-8C show splicing two optical fibers and deploying protective sleeve 40. Referring to FIG. 8A, ferrule flange assembly 11 with optical fiber pigtail 33 is spliced 32 (at FIG. 8B) to incoming optical fiber within optical fiber sheath 30. FIG. 8C shows protective sleeve 40 secured to a distal end of ferrule flange assembly 11.

An ordinarily skilled person in the art can appreciate that by following the principal of the present invention, a version of the adapter for mating a multi-fiber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A ferrule flange assembly, comprising:
    a ferrule locking flange for securing the ferrule flange assembly within a fiber optic connector housing;
    a ferrule at a proximal end of the ferrule locking flange, the ferrule has at least one optical fiber pigtail protruding from a distal end of the ferrule flange assembly;
    an inner flange and a flange retention stub concentric with each. other and forming a circumferential opening therebetween at the distal end of the ferrule locking flange;
    the circumferential guide opening accepts a second end of a protective sleeve; and wherein
    the protective sleeve protects a fiber splice section formed by splicing the optical fiber pigtail and an optical fiber provided from a first end of the protective sleeve;
    wherein the ferrule flange comprises a distal facing portion configured to engage a proximal end portion of a ferrule spring and a proximal facing portion configured to engage a distal facing stop of a connector housing such that the ferrule spring yieldably biases the ferrule flange in the proximal direction against the stop and the ferrule flange is displaceable as a unit in the distal direction away from the stop as the spring yields.

2. The ferrule flange assembly of claim 1, wherein the splice is formed using selected from at least one of heat, fusion, mechanical, or chemical.

\* \* \* \* \*